(12) United States Patent
Toukairin et al.

(10) Patent No.: US 8,711,513 B1
(45) Date of Patent: Apr. 29, 2014

(54) DISK DRIVE

(71) Applicant: Kabushiki Kaisha Toshiba, Tokyo (JP)

(72) Inventors: Kouichi Toukairin, Kawasaki (JP); Naoto Akatsuka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/911,936

(22) Filed: Jun. 6, 2013

(30) Foreign Application Priority Data

Jan. 11, 2013  (JP) ................................. 2013-003816

(51) Int. Cl.
*G11B 33/14* (2006.01)

(52) U.S. Cl.
USPC ....................................... 360/97.14

(58) Field of Classification Search
CPC .. G11B 33/14; G11B 33/148; G11B 33/1486; G11B 33/08; G11B 33/1473
USPC ....................... 360/97.12–97.18, 99.18, 98.01
See application file for complete search history.

(56) References Cited

U.S. PATENT DOCUMENTS

| | | | |
|---|---|---|---|
| 6,728,062 B1 * | 4/2004 | Ou-Yang et al. | 360/97.14 |
| 6,989,959 B2 | 1/2006 | Chang et al. | |
| 8,199,427 B2 | 6/2012 | Murakami et al. | |
| 2003/0156352 A1 * | 8/2003 | Voights et al. | 360/97.02 |
| 2007/0188914 A1 * | 8/2007 | Gross | 360/97.02 |
| 2013/0135770 A1 * | 5/2013 | Choi et al. | 360/97.13 |
| 2013/0155548 A1 * | 6/2013 | Kim | 360/133 |

FOREIGN PATENT DOCUMENTS

| | | |
|---|---|---|
| JP | 2004-013925 A | 1/2004 |
| JP | 2004-515867 A | 5/2004 |
| JP | 2010-033680 A | 2/2010 |

* cited by examiner

*Primary Examiner* — Allen T Cao
(74) *Attorney, Agent, or Firm* — Knobbe Martens Olson & Bear LLP

(57) ABSTRACT

According to one embodiment, a disk drive includes a housing, a disk recording medium in the housing, a drive motor, a head, a carriage configured to support the head for movement, and a flow regulation member between the recording medium and a sidewall of the housing, except for a moving region for the carriage. The flow regulation member includes a shroud member, which is located substantially flush the recording medium and adjacently faces the outer peripheral edge of the recording medium, and a plurality of fins protruding from the shroud member and configured individually to guide an airflow passing along a surface of the recording medium toward the outer periphery of the shroud member and prevent a backflow toward a center of the recording medium.

15 Claims, 6 Drawing Sheets

DISK DRIVE

CROSS-REFERENCE TO RELATED APPLICATIONS

This application is based upon and claims the benefit of priority from Japanese Patent Application No. 2013-003816, filed Jan. 11, 2013, the entire contents of which are incorporated herein by reference.

FIELD

Embodiments described herein relate generally to a disk drive comprising a disk recording medium rotatable at high speed.

BACKGROUND

In general, a disk drive, such as a hard disk drive (HDD), comprises a magnetic disk, spindle motor, magnetic head, carriage assembly, voice coil motor, board unit, etc. The spindle motor serves to rotate the magnetic disk. The magnetic head reads data from and writes data to the magnetic disk. The carriage assembly supports the magnetic head. The voice coil motor serves to drive the carriage assembly. All these components are accommodated in a substantially sealed housing.

In the HDD of this type, the number of rotation of the magnetic disk must be increased to perform high-speed data processing. If the magnetic disk rotates at high speed, however, airflow is produced that rotates in the same direction as the magnetic disk, and a phenomenon called disk flutter is caused such that the magnetic disk vibrates because of disturbance of this airflow. Further, airflow disturbance acts on the carriage that supports the magnetic head, whereupon the carriage is displaced. In this case, the accuracy of positioning of the magnetic head relative to the magnetic disk is reduced, so that the recording density cannot be increased.

A magnetic disk drive is adopted in which a squeeze plate or spoiler is opposed to a surface of a magnetic disk with a small gap, in order to regulate airflow produced by high-speed rotation of the magnetic disk. This flow regulation plate is disposed so as to cover the entire opposite surfaces of the magnetic disk except movement paths for a magnetic head and arm. Another device is adopted in which a flow regulation plate or posture stabilizing member opposed to a surface of a magnetic disk with a small gap is provided covering the entire area around an arm except movement paths for a magnetic head and the arm.

Airflow disturbance acting on an actuator can be suppressed to improve the on-track accuracy by means of the squeeze plate or spoiler interposed between magnetic disk surfaces. According to this arrangement, however, the rotational loss of the magnetic disk is increased, so that the motor power consumption is increased. In view of the recent development of improved energy-saving technologies, high recording density should be achieved without increasing in energy consumption.

DETAILED DESCRIPTION

Various embodiments will be described hereinafter with reference to the accompanying drawings. In general, according to one embodiment, a disk drive comprises a housing comprising a bottom wall and a sidewall set up along a peripheral edge portion of the bottom wall; a drive motor on the bottom wall of the housing; a disk recording medium supported and rotated by the drive motor; a head configured to process information for the recording medium; a carriage configured to support the head for movement with respect to the recording medium; and a flow regulation member between an outer peripheral edge of the recording medium and the sidewall of the housing, except for a moving region for the carriage. The flow regulation member comprises a circular-arc-shaped shroud member, which is located substantially flush the recording medium and adjacently faces the outer peripheral edge of the recording medium, and a plurality of fins protruding from the shroud member and configured individually to guide an airflow passing along a surface of the recording medium toward the outer periphery of the shroud member and prevent a backflow toward a center of the recording medium.

Figure 1:
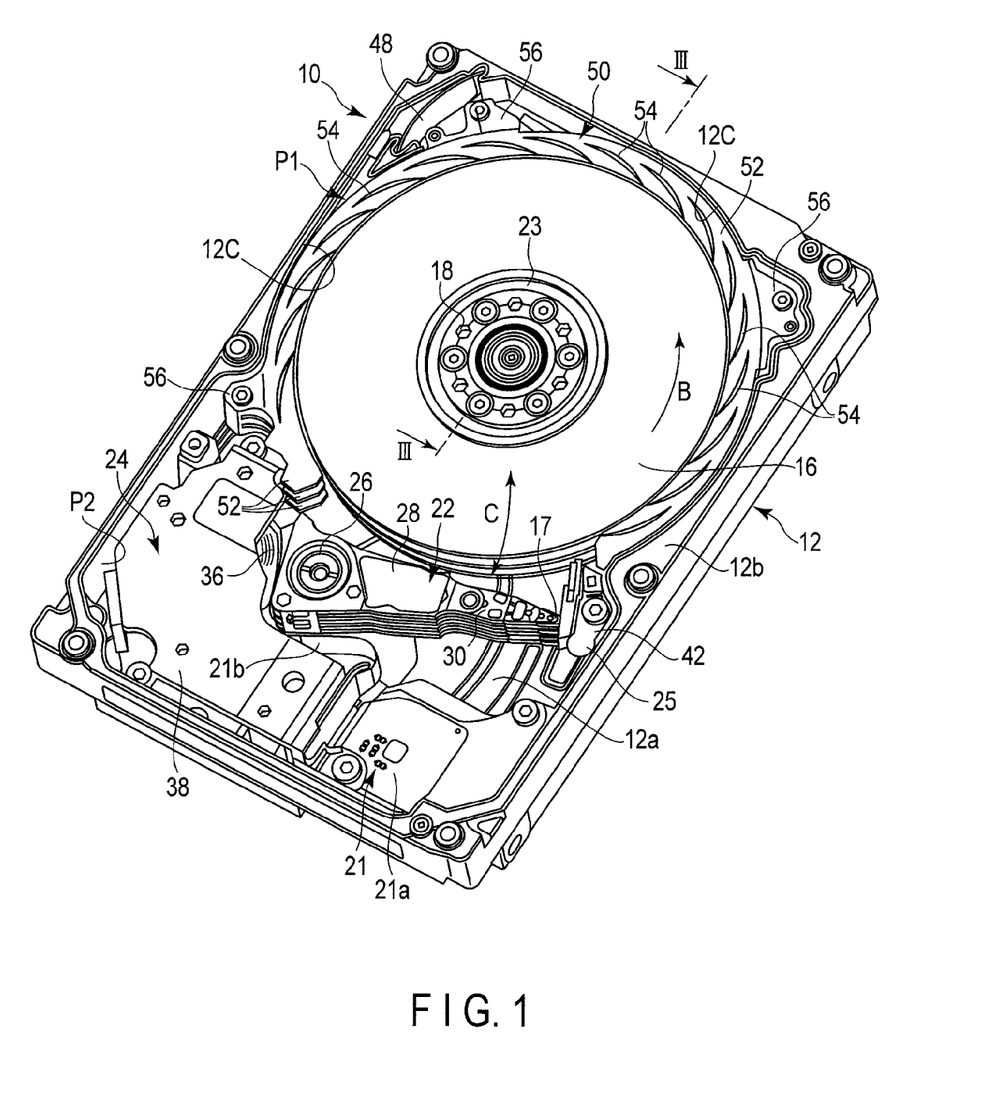
FIG. 1 is a perspective view showing an HDD according to an embodiment with its top cover removed.
Figure 2:
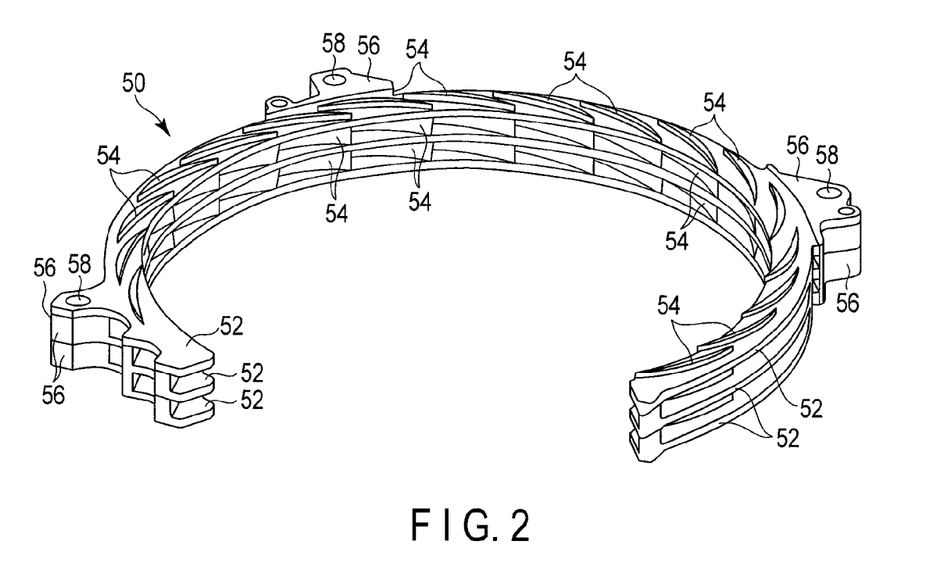
FIG. 2 is a perspective view showing a flow regulation member of the HDD.
Figure 3:
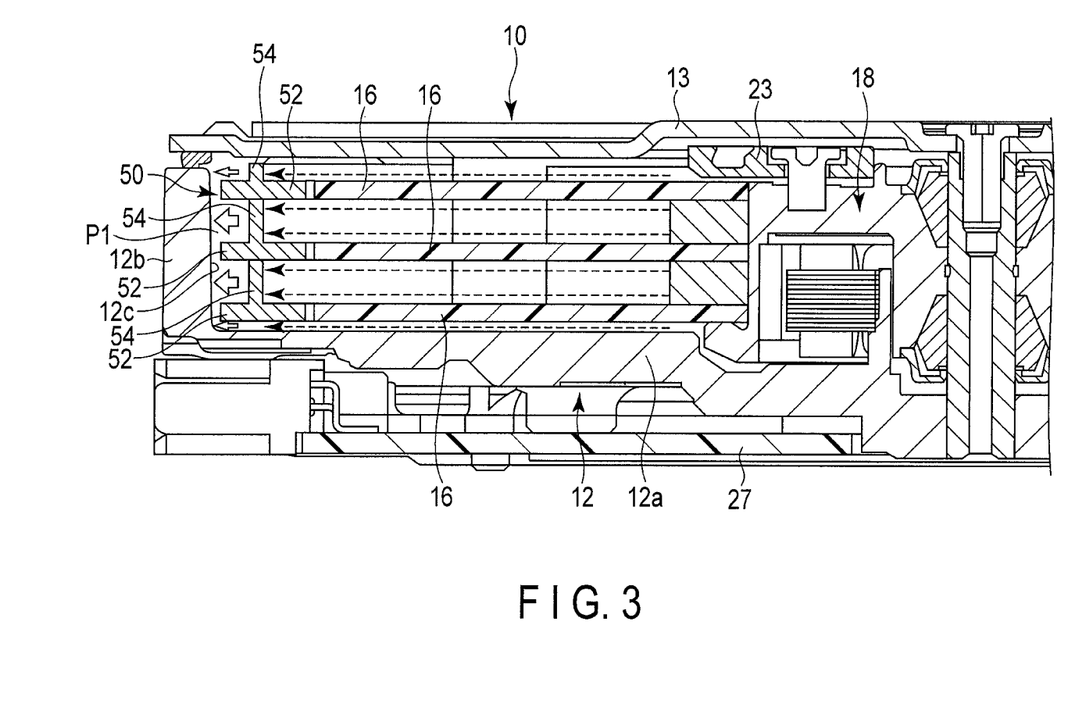
FIG. 3 is a sectional view of the HDD taken along line of FIG. 1.

FIG. 1 shows the internal structure of an HDD with its top cover removed, FIG. 2 shows a flow regulation member of the HDD, and FIG. 3 shows a cross-section of the HDD taken along line of FIG. 1.

As shown in FIGS. 1 and 3, the HDD comprises a housing 10. The housing 10 comprises a base 12 in the form of an open-topped rectangular box and a top cover 13 (not shown in FIG. 1), which is attached to the base by screws so as to close the top opening of the base. The base 12 comprises a rectangular bottom wall 12a and sidewall 12b set up along the peripheral edge of bottom wall. The base 12 is integrally formed by die-casting a metal, such as aluminum. A gasket for better air-tightness is sandwiched between the top cover 13 and the peripheral edge portion of the base 12.

A spindle motor 18 and a plurality (for example, three) of magnetic disks 16 are arranged in the housing 10. The spindle motor 18 is mounted on the bottom wall 12a of the base 12 and serves as a drive motor. The magnetic disks 16 are rotated by the spindle motor. The magnetic disks 16 for use as recording media are not limited to three in number and may be two or one or four or more.

Further, the housing 10 accommodates a plurality (for example, four) of magnetic heads 17, carriage assembly 22, voice coil motor (VCM) 24, ramp loading mechanism 25, latch mechanism (not shown), and board unit 21. The magnetic heads 17 write data to and read data from the magnetic disks 16. The carriage assembly 22 supports the heads 17 for movement relative to the magnetic disks 16. The VCM 24 pivots and positions the carriage assembly 22. The ramp loading mechanism 25 holds the magnetic heads 17 in a retracted position off the magnetic disks 16 when the magnetic heads are moved to the outermost peripheries of the magnetic disks. The latch mechanism holds the carriage assembly 22 in a retracted position if the HDD is shocked, for example. The board unit 21 comprises a preamplifier and the like.

A printed circuit board 27 is attached to the outer surface of the bottom wall 12a of the base 12 by screws. The circuit board 27 constitutes a control unit that controls the operations of the spindle motor 18, VCM 24, and magnetic heads 17 through the board unit 21.

Each magnetic disk 16 has a diameter of, for example, 65 mm (2.5 inches) and comprises, for example, a base material of glass and magnetic recording layers on its upper and lower surfaces, individually. The three magnetic disks 16 are coaxially fitted on a hub (not shown) of the spindle motor 18 and arranged in spaced layers. The disks 16 are clamped and secured to the hub by a clamp spring 23. Thus, the magnetic disks 16 are supported parallel to the bottom wall 12a of the base 12. The disks 16 are rotated in the direction of arrow B at a predetermined speed of, for example, 5,400 or 15,000 rpm by the spindle motor 18.

That part of the sidewall 12b which is located in substantially half the area of the base 12 with respect to its longitudinal direction surrounds the outer peripheral edges of the magnetic disks 16. The sidewall 12b comprises a facing surface 12c that stands substantially upright from the bottom wall 12a. The facing surface 12c continuously extends in a circular arc along and opposite the outer peripheral edges of the disks 16 with a small gap. Thus, the sidewall 12b comprising the facing surface 12c constitutes a shroud for the disks 16.

As shown in FIG. 1, the carriage assembly 22 comprises a bearing 26 mounted on the bottom wall 12a of the base 12 and six arms 28 extending from the bearing. The bearing 26 is spaced apart from the center of rotation of the magnetic disks 16, longitudinally relative to the base 12, and is located near the outer peripheral edges of the disks 16. The six arms 28 are arranged parallel to the surfaces of the disks 16 and at predetermined spaces from one another and extend in the same direction from the bearing 26. The carriage assembly 22 comprises elastically deformable suspensions 30 each in the form of an elongated plate. Each suspension 30 is formed of a plate spring, the fixed end of which is secured to the tip end of its corresponding arm 28 by spot welding or crimping and extends from the arm. Alternatively, each suspension 30 may be formed integrally with its corresponding arm 28.

Each magnetic head 17 is mounted on an extended end of its corresponding suspension 30. Each two of the six heads 17 mounted individually on the suspensions 30 are opposed to each other and face the opposite surfaces of each corresponding magnetic disk 16.

The carriage assembly 22 comprises a support frame extending from the bearing 26 so as to be directed opposite from the arms 28. The support frame supports a voice coil 36 that constitutes a part of the VCM 24. The frame is a plastic or aluminum structure that is molded integrally on the outer periphery of the voice coil 36. The VCM 24, which functions as a drive section, comprises a pair of yokes 38 on the bottom wall 12a of the base 12 and magnets (not shown) secured individually to the respective inner surfaces of the yokes. The voice coil 36 mounted on the carriage assembly 22 is located between the two magnets.

If the voice coil 36 is turned on the power, the carriage assembly 22 pivots in the direction of arrow C about the bearing 26, whereupon each magnetic head 17 is moved to and positioned at a desired track of the corresponding magnetic disk 16. Thus, the magnetic head 17 can write data to or read data from the disk 16. The carriage assembly 22 and VCM 24 constitute a head actuator.

The ramp loading mechanism 25 comprises a ramp 42, mounted on the bottom wall 12a of the base 12 and located outside the magnetic disks 16, and tabs (not shown) extending individually from the respective tip ends of the suspensions 30. The ramp 42 is located downstream relative to the bearing 26 with respect to the direction of rotation B of the disks 16. As the carriage assembly 22 pivots so that the magnetic heads 17 are moved to the retracted position outside the magnetic disks 16, each tab 44 slides on a ramp surface formed on the ramp 42, and is then pushed up the slope of the ramp surface to unload the magnetic heads 17.

The board unit 21 comprises a body 21a formed of a flexible printed circuit board, which is secured to the bottom wall 12a of the base 12. Electronic components, such as a head amplifier, are mounted on the body 21a. The board unit 21 comprises a main flexible printed circuit board (main FPC) 21b extending from the body 21a. An extended end of the main FPC 21b is mounted to the vicinity of the bearing 26 of the carriage assembly 22. Further, the extended end is electrically connected to the magnetic heads 17 by cables (not shown) arranged on the arms 28 and suspensions 30. Connectors (not shown) for connection with the printed circuit board 27 are mounted on the bottom surface of the body of the board unit 21.

As shown in FIG. 1, the HDD comprises a circulatory filter 48, which serves to trap dust produced in the housing as a movable part or parts are operated. The circulatory filter 48 is located around the magnetic disks 16.

Figure 4:
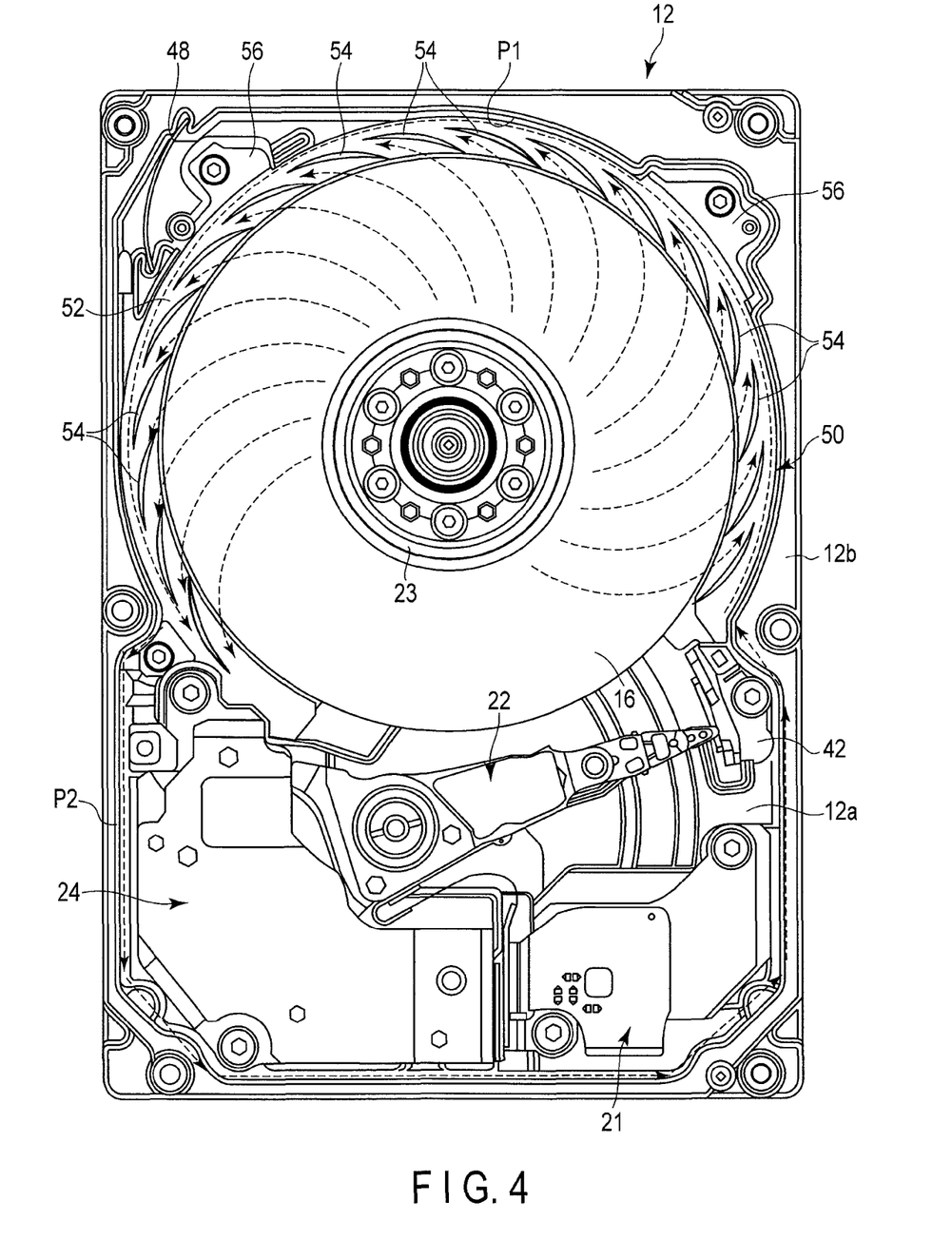
FIG. 4 is a plan view schematically showing air flow generated in the HDD.

In the HDD, as shown in FIGS. 1 and 4, a gap is formed between the outer peripheral edges of the magnetic disks 16 and the sidewall 12b of the housing 10. An air path P1 is formed by this gap. Likewise, a small gap is formed between the sidewall 12b and other components (VCM 24, board unit 21, and ramp 42), and a path P2 through which air flows is formed by this gap.

As shown in FIGS. 1 to 4, the HDD comprises a flow regulation member 50, which regulates airflow in the housing 10 to improve the positioning performance of the magnetic heads 17 relative to the magnetic disks 16. The flow regulation member 50 comprises three shroud members 52 equal in number to the magnetic disks 16 and a plurality of fins 54 protruding from each of the shroud members 52. Each shroud member 52 is a long and narrow plate in the shape of a circular arc with diameter slightly larger than that of each magnetic disk 16.

Figure 5:
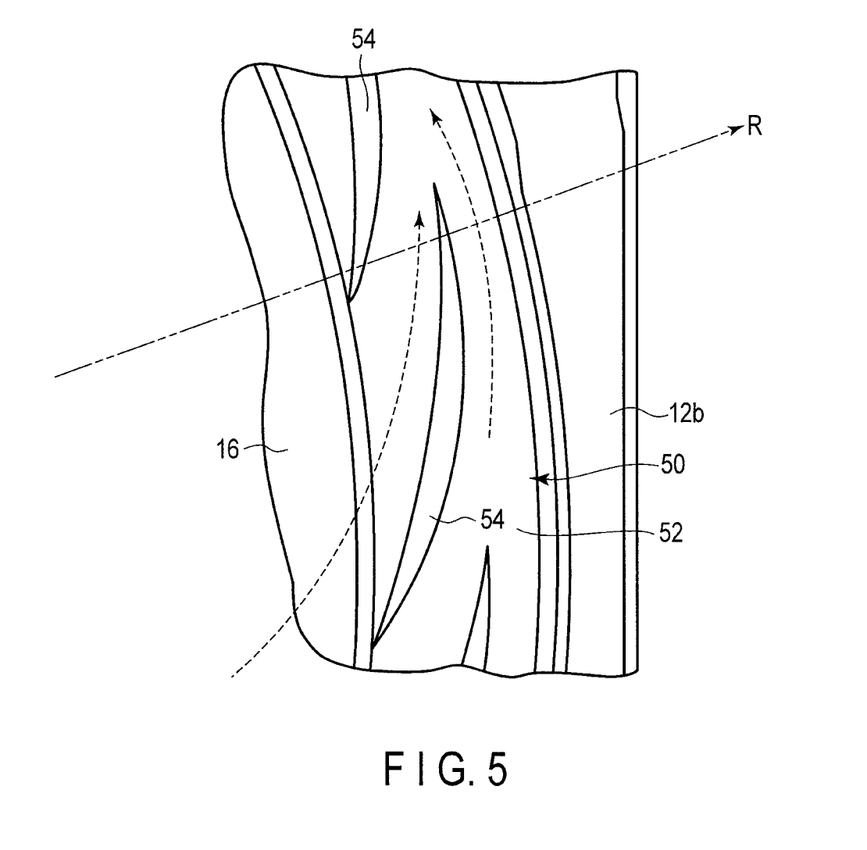
FIG. 5 is an enlarged plan view showing fins of the flow regulation member and their surroundings.

The fins 54 protrude substantially perpendicularly from the upper surface of each shroud member 52. The fins 54 are located at predetermined intervals in the circumferential direction of the shroud member 52 and dispersed substantially along the entire circumference of the shroud member 52. Each fin 54 is formed in the shape of, for example, a circular arc or streamline and extends obliquely relative to the direction of rotation B of the magnetic disks 16 from the inner peripheral edge of each corresponding shroud member 52. Further, each fin 54 is spaced apart from the outer peripheral edge of the shroud member 52. As shown in FIG. 5, moreover, each fin 54 is disposed and formed so that its outer peripheral end portion is located overlapping, in the radial direction R of the magnetic disks 16, the inner peripheral end portion of its adjacent fin 54 that is located downstream with respect to the direction of rotation B. In the present embodiment, the shroud members 52 and fins 54 are integrally molded from a synthetic resin.

As shown in FIGS. 2 and 3, the three shroud members 52 are located in parallel layers and constitute the circular-arcshaped flow regulation member 50 as a whole. The flow regulation member 50 comprises fixing portions 56 protruding radially outward from a plurality (for example, three) of parts of each shroud member 52. The respective fixing portions 56 of the three shroud members 52 are laminated and fixedly bonded to one another. Each fixing portion 56 is formed with a through-hole 58 for a screw. Further, the upper ends of the fins 54 on the second- and third-tier shroud members 52 is in close contact with the lower surfaces of the upper tier shroud member, i.e., the first and second-tier shroud members 52. Specifically, the projecting height of each of the fins 54 on the second- and third-tier shroud members 52 is substantially equal to the distance between each two adjacent magnetic disks 16.

The fins 54 may be formed protruding from the lower surface or both surfaces of each shroud member 52, as well as from the upper surface. If the fins 54 are formed protruding from both sides of each shroud member 52, the fins on the adjacent shroud members are arranged so that their respective distal ends abut one another.

As shown in FIGS. 1, 3 and 4, the flow regulation member 50 constructed in this manner is arranged between the sidewall 12b (circular-arc-shaped facing surface 12c) of the housing 10 and the outer peripheral edges of the magnetic disks 16, except for a moving region for the carriage assembly 22. The flow regulation member 50 is secured to the base 12 with the fixing portions 56 attached to the base 12 by screws. Thus, the flow regulation member 50 is located coaxially with the center of each magnetic disk 16. The three shroud members 52 are located substantially flush with their corresponding magnetic disks 16 and adjacently face the outer peripheral edges of the magnetic disks 16 with a small gap. The upper and lower surfaces of each shroud member 52 are located substantially flush with those of the magnetic disk 16, respectively. Further, the outer peripheral edge of each shroud member 52 faces the facing surface 12c of the base 12 with a small gap.

As described before, the fins 54 are dispersed substantially along the entire circumference of each shroud member 52 and extend obliquely relative to the direction of rotation B of the magnetic disks 16 from the inner peripheral edge of the shroud member 52. Further, the fins 54 protrude substantially perpendicularly from the shroud member 52 so that they are hit by air flowing along the surface of each magnetic disk 16. The air path P1 is formed between the outer peripheral edge of the shroud member 52 and the sidewall 12b and between the outer peripheral side surface of each fin 54 and the sidewall 12b.

If the magnetic disks 16 rotate at high speed, as shown in FIGS. 3 to 5, airflow is produced along the surface of each magnetic disk 16, and it passes in the direction of rotation B from the center of the magnetic disk 16 toward the outer periphery. This airflow is guided along the upper and lower surfaces of each shroud member 52 of the flow regulation member 50 and delivered to the air path P1. As this is done, the fins 54 smoothly guide the airflow in the direction of rotation B to the air path P1 and prevent air from flowing back toward the center of the magnetic disk 16. Thereupon, the airflow produced by the high-speed rotation of the magnetic disks 16 passes along the air path P1 on the outer peripheral side of the magnetic disks, further passes through the path P2 along the sidewall 12b of the housing 10, and passes again into the air path P1. Thus, the airflow that hits the carriage assembly 22 is considerably reduced, so that the density of air received by the carriage assembly 22 can be reduced.

Figure 6A:
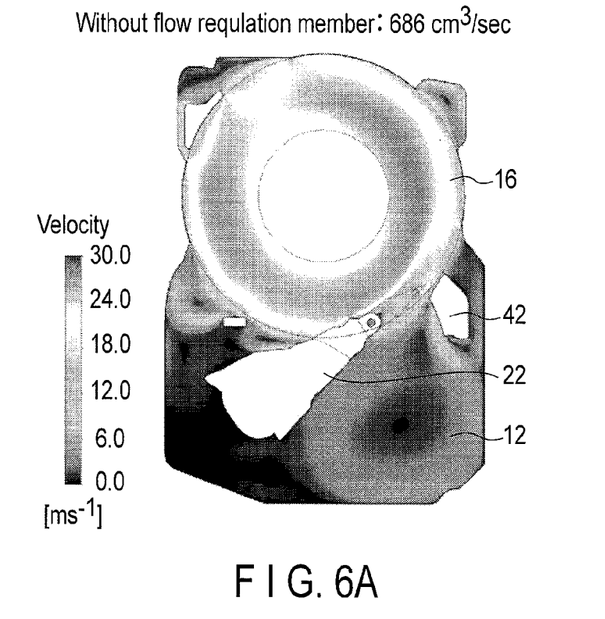
FIG. 6A is a diagram showing the result of a simulation of the flow rate of airflow received at a carriage of an HDD without the flow regulation member.
Figure 6B:
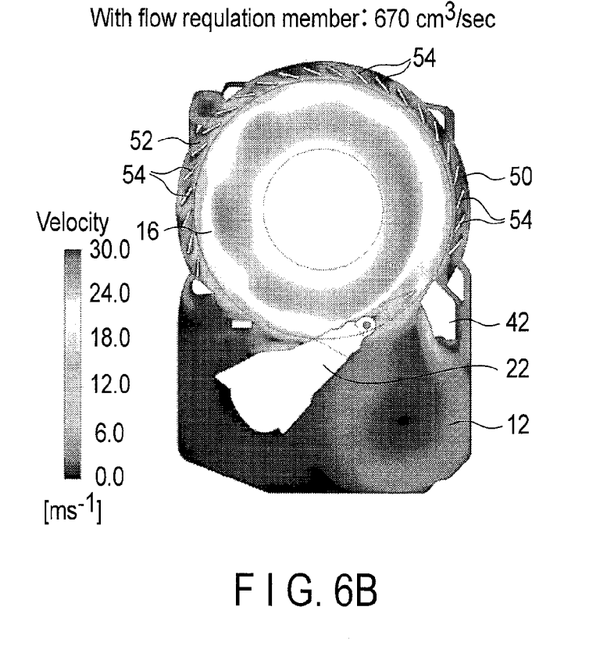
FIG. 6B is a diagram showing the result of a simulation of the flow rate of airflow received at a carriage of the HDD according to the present embodiment comprising the flow regulation member.

FIG. 6A shows the result of a simulation of the flow rate of the airflow received by a carriage assembly of an HDD according to a comparative example without the flow regulation member 50. FIG. 6B shows the result of a simulation of the flow rate of the airflow received by the carriage assembly 22 of the HDD according to the present embodiment comprising the flow regulation member 50.

As seen from these figures, the flow rate of the airflow received by the carriage assembly 22 of the HDD of the present embodiment is 670 $cm^3$/s, which is lower than 686 $cm^3$/s for the comparative example (FIG. 6A). This indicates that the airflow generated on the magnetic disk surfaces can be suitably passed through the air path P1 around the magnetic disks.

According to the HDD constructed in this manner, turbulence can be prevented to reduce disk flutter by regulating the airflow by means of the shroud members 52 of the flow regulation member 50. Further, airflow disturbance against the carriage assembly 22 can be suppressed by preventing backflow toward the center of each magnetic disk 16 by means of the fins 54. Thus, disturbance displacement of the suspensions, as well as vibration of the magnetic disks due to airflow disturbance, can be reduced, so that the accuracy of positioning of the magnetic heads relative to the magnetic disks is improved. At the same time, the airflow generated on the magnetic disk surfaces is suitably passed through the air path around the disks, and its backflow from the outer periphery to the center of each magnetic disk is prevented. In this way, the generated airflow can be suitably regulated to reduce the rotational loss of each magnetic disk 16 itself can be reduced. Consequently, the power consumption of the spindle motor for rotating the magnetic disks can be reduced. Thus, the track pitch of the magnetic disks can be narrowed, and the storage capacity and the rate of rotation can be increased, so that a high-performance magnetic disk drive can be obtained. Furthermore, there can be obtained a disk drive configured so that airflow disturbance against the carriage assembly (actuator) can be reduced to improve the recording density without increasing the motor power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Although the three magnetic disks are used in the arrangement of the embodiment described herein, for example, the number of magnetic disks used may be increased or decreased as required. If a single magnetic disk is used for the purpose, the flow regulation member is configured to comprise a single shroud member with fins protruding from its upper and lower surfaces. The shapes of the shroud member and fins may be variously changed without being limited to the embodiment. The fins, in particular, need only be shaped so that they can smoothly guide the airflow on each magnetic disk to the outer periphery of the disk and prevent the airflow from flowing back toward the center of the disk. Further, the shroud members and fins may be formed integrally with one another.

What is claimed is:
1. A disk drive comprising:
   a housing comprising a bottom wall and a sidewall set up along a peripheral edge portion of the bottom wall;
   a drive motor on the bottom wall of the housing;

a disk recording medium supported and rotated by the drive motor;

a head configured to process information for the recording medium;

a carriage configured to support the head for movement with respect to the recording medium; and a flow regulation member between an outer peripheral edge of the recording medium and the sidewall of the housing, except for a moving region for the carriage, and comprising a circular-arc-shaped shroud member, which is located substantially flush the recording medium and adjacently faces the outer peripheral edge of the recording medium, and a plurality of fins protruding from the shroud member and configured individually to guide an airflow passing along a surface of the recording medium toward the outer periphery of the shroud member and prevent a backflow toward a center of the recording medium.

2. The disk drive of claim 1, wherein the shroud member is a plate comprising upper and lower surfaces flush with upper and lower surfaces of the recording medium, respectively, the plurality of fins protrude from at least one of the upper surface and the lower surface of the shroud member, and are arranged at predetermined intervals in a circumferential direction of the shroud member.

3. The disk drive of claim 2, wherein each of the fins is in the shape of a circular arc or a streamline.

4. The disk drive of claim 3, wherein the fins extend obliquely relative to the direction of rotation of the recording medium from an inner peripheral edge of the shroud member toward an outer peripheral edge thereof, and each of the fins is disposed so that an outer peripheral end portion thereof overlaps, radially relative to the recording medium, an inner peripheral end portion of another fin located adjacent thereto and downstream with respect to the direction of rotation of the recording medium.

5. The disk drive of claim 4, wherein the sidewall of the housing comprises a facing surface continuously extending in a circular arc along and opposite the outer peripheral edge of the shroud member with a small gap.

6. The disk drive of claim 5, wherein the gap between the facing surface of the sidewall and the outer peripheral edge of the shroud member and a gap between the facing surface of the sidewall and the fins form an air path through which air flows.

7. The disk drive of claim 1, wherein each of the fins is in the shape of a circular arc or a streamline.

8. The disk drive of claim 1, wherein the fins extend obliquely relative to the direction of rotation of the recording medium from an inner peripheral edge of the shroud member toward an outer peripheral edge thereof, and each of the fins is disposed so that an outer peripheral end portion thereof overlaps, radially relative to the recording medium, an inner peripheral end portion of another fin located adjacent thereto and downstream with respect to the direction of rotation of the recording medium.

9. The disk drive of claim 1, wherein the sidewall of the housing comprises a facing surface continuously extending in a circular arc along and opposite the outer peripheral edge of the shroud member with a small gap therebetween.

10. The disk drive of claim 9, wherein the gap between the facing surface of the sidewall and the outer peripheral edge of the shroud member and a gap between the facing surface of the sidewall and the fins define an air path through which air flows.

11. The disk drive of claim 2, wherein the fins extend obliquely relative to the direction of rotation of the recording medium from an inner peripheral edge of the shroud member toward an outer peripheral edge thereof, and each of the fins is disposed so that an outer peripheral end portion thereof overlaps, radially relative to the recording medium, an inner peripheral end portion of another fin located adjacent thereto and downstream with respect to the direction of rotation of the recording medium.

12. The disk drive of claim 2, wherein the sidewall of the housing comprises a facing surface continuously extending in a circular arc along and opposite the outer peripheral edge of the shroud member with a small gap.

13. The disk drive of claim 12, wherein the gap between the facing surface of the sidewall and the outer peripheral edge of the shroud member and a gap between the facing surface of the sidewall and the fins form an air path through which air flows.

14. The disk drive of claim 3, wherein the sidewall of the housing comprises a facing surface continuously extending in a circular arc along and opposite the outer peripheral edge of the shroud member with a small gap.

15. The disk drive of claim 14, wherein the gap between the facing surface of the sidewall and the outer peripheral edge of the shroud member and a gap between the facing surface of the sidewall and the fins form an air path through which air flows.

* * * * *